March 12, 1963  J. E. LOVRET  3,080,777
REAMERS
Filed Feb. 16, 1961

JOHN E. LOVRET
INVENTOR.

BY *Eric Pick*
ATTORNEY

United States Patent Office 3,080,777
Patented Mar. 12, 1963

3,080,777
REAMERS
John E. Lovret, 145—20 243rd St., Rosedale, N.Y.
Filed Feb. 16, 1961, Ser. No. 89,694
2 Claims. (Cl. 77—72)

This invention relates to reamers; and it comprises a rod carrying a ball at one end, the diameter of said ball being larger than the diameter of said rod, and two faces formed on said ball at an oblique angle to each other and substantially parallel to the axis of said rod, all as more fully described hereinafter and as claimed.

In certain of its aspects this invention is an improvement on my prior patent 2,930,264 dated March 29, 1960.

It is the object of this invention to provide a reamer which is strong, durable, effective, easily re-sharpened, yet simple and inexpensive to manufacture.

The manner in which this object is achieved is shown in the appended drawing in which.

Figure 6:
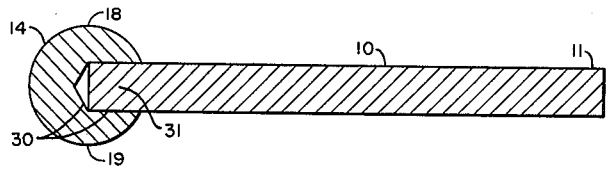
FIGS. 5 and 6 are alternative cross-sectional views, similar to FIG. 2, of modifications of the reamer shown in FIGS. 1 to 4.

Referring now to FIGS. 1 to 4, my novel reamer comprises a cylindrical rod 10 having an end 11 adapted for chucking or holding, and a spherical recess or cavity 12 at its other end. Into the recess 12 is fitted a ball 14. The recess 12 has a radius of curvature equal to or slightly smaller than the radius of ball 14 and it is made concentric with the axis 13 of the rod 10 so that the ball 14 centers itself on the axis 13 of the rod 10. The ball 14 is secured in the recess 12.

On the ball 14 are ground two faces 15 and 16 at an oblique angle to each other and parallel to the axis 13, although in certain cases a slight angle between the axis 13 and each of the faces 15 and 16 may be found satisfactory. The faces 15 and 16 define on the surface portion of the ball 14 adjacent to its great circle which is at right angles to the axis 13 (in the plane indicated by lines 17—17 in FIG. 2) a peripherally relatively short cutting part 18, extending through an angle of 20 degrees or less, and a peripherally relatively long bearing part 19 extending through an angle of 90 to 180 degrees along said great circle in the plane 17—17.

The cutting part 18 should be relatively short peripherally to provide effective performance. The bearing part 19, on the other hand should be relatively long peripherally to provide a low bearing pressure and leave sufficient material in the ball 14 to give it adequate strength. A peripheral length of between 90 and 180 degrees is satisfactory. However, this length should not substantially exceed 180 degrees along the periphery because it then would tend to center the reamer in the hole to be reamed and interfere with its cutting action.

The ball 14 is made of a suitably hard metal such as carbide, so-called high-speed steel or other ferrous material, or a hard non-metallic material such as diamond, ruby, sapphire and high-strength ceramics. The method used to secure the ball 14 to the rod 10 will depend on the material of the ball 14. If the ball 14 is made of metal it may be secured by soft, hard or silver soldering, brazing, welding or cementing with one of the modern high-strength adhesives, such as the type based on epoxy resin. If it is made of non-metallic material, it may be first metallized, as with silver or copper, and then silver soldered to the rod 10; as an alternative, a non-metallic ball may be secured to the rod 10 by cementing or by any of the conventional means used to secure non-metallic materials to metals, such as crimping, lacing or wedging. The rod 10 need not be hardened. The steel sold under the trade designation "drill rod" is well suited for making the rod 10. Balls made of various suitable materials and accurately ground to close tolerances are commercially available at moderate cost and by their use reamers in accordance with my invention may be produced quite economically.

Figure 5:
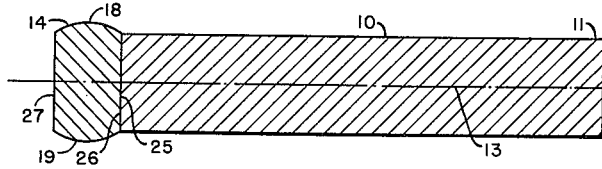

FIGS. 5 and 6 show modifications of my reamer. In FIG. 5, the end of rod 10 has a flat face 25 matching a flat 26 ground on ball 14. The flat 26 is secured to the face 25 by one of the methods described above. In this modification there is a circular flat surface 27, concentric with the axis 13, ground on the ball 14 opposite to the flat 26. The surface 27 preferably has a diameter somewhat smaller than that of the ball 14. This modification makes it possible to ream a dead end or blind hole almost all the way to its bottom.

In FIG. 6 the ball is provided with a bore 30 into which the end 31 of rod 10 is secured, the diameter of rod 10 in this case being substantially smaller than the diameter of ball 14.

Figure 2:
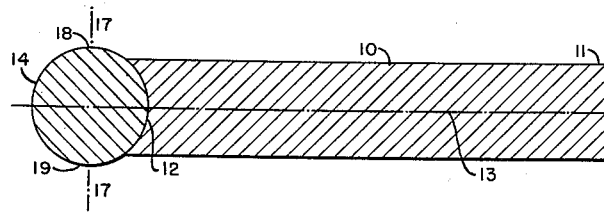
FIG. 2 is a cross-sectional view along lines 2—2 of FIG. 1.
Figure 1:
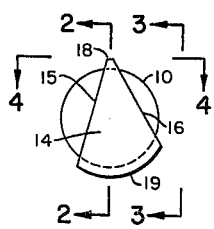
FIG. 1 is an end view of a reamer according to my invention.

The construction shown in FIG. 6 is particularly suitable for large reamers with balls 14 having a diameter of several inches. For smaller sizes, with balls 14 having a diameter of one inch or less, the constructions shown in FIGS. 2 and 5 are generally more suitable, the diameter of rod 10 being only slightly smaller than the diameter of ball 14. For example, a reamer with a ball 14 having a diameter of 5⁄8 inch and a rod having a diameter of one-half inch has been found quite satisfactory.

Figure 4:
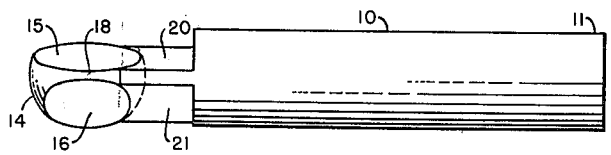
FIG. 4 is a side view taken along lines 4—4 of FIG. 1.
Figure 3:
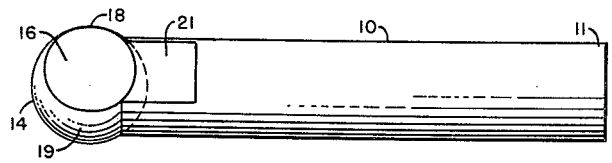
FIG. 3 is a side view taken along lines 3—3 of FIG. 1.

When the faces 15 and 16 are ground on the balls 14 of the construction shown in FIGS. 1 to 5, with the rod 10 only slightly smaller in diameter than the ball 14, the grinding unavoidably extends to part of the rod 10, producing the face portions indicated at 20 and 21 in FIGS. 3 and 4. When the rod 10, however, is substantially smaller in diameter than the ball 14, as in FIG. 6, the grinding of faces 15 and 16 is generally confined to the ball 14 and does not extend into the rod 10.

Figure 7:
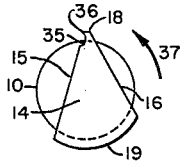
FIG. 7 is a view, similar to FIG. 1, of another modification.

In the modification shown in FIG. 7, a groove 35 is formed, preferably by grinding, in the face 15 adjacent to the cutting part 18. This groove 35 runs parallel to the axis of the rod 10 and gives the cutting edge 36 a so-called positive rake, very desirable for effective and clean cutting on certain materials, such as cold rolled steel. In operation the reamer is rotated in the direction indicated by the arrow 37.

Since the cutting action of my reamer takes place on a ball-shaped portion and the rod has a smaller diameter, extremely accurate alignment of the axis of the hole to be reamed with the axis of the reamer is not necessary. Lack of such accurate alignment is a frequent cause of breakage with conventional fluted reamers.

If reamers in accordance with my invention become dull in the course of use, the cutting edge may readily be restored, without affecting the diameter, by merely slightly grinding or honing one or both of the faces 15 and 16.

While good reamers are obtained when the faces 15 and 16 are flat, as shown in FIGS. 1 to 6, they may also be made other than flat, such as shown in FIG. 7, or convex or concave, if desired. Other modifications may be made without departing from the spirit of my invention, and reference is therefore made to the following claims for a definition of the scope of my invention.

What I claim is:
1. A reamer comprising a rod having one end adapted for chucking, a ball secured to the other end of said rod, the diameter of said ball being larger than the diameter of said rod, two faces formed on said ball at an oblique angle to each other and substantially parallel to the axis of said rod, said two faces defining on a surface portion of said ball adjacent its great circle at right angles to the axis of said rod a peripherally relatively long bearing part and a peripherally relatively short cutting part, said bearing and cutting parts each extending from one of said faces to the other, each of said faces extending from said bearing part to said cutting part, and a circular flat surface concentric with the axis of said rod formed on said ball opposite to the part secured to said rod.

2. A reamer according to claim 1, said circular flat surface having a diameter smaller than the diameter of said ball.

References Cited in the file of this patent

UNITED STATES PATENTS

| | | |
|---|---|---|
| 1,063,995 | Mintz | June 10, 1913 |
| 2,930,264 | Lovret | Mar. 29, 1960 |

FOREIGN PATENTS

| | | |
|---|---|---|
| 329,395 | Germany | Nov. 20, 1920 |